Sept. 8, 1959  F. L. PALMER ET AL  2,903,037
TRACTION ATTACHMENT FOR WHEELS
Filed March 17, 1958  3 Sheets-Sheet 1
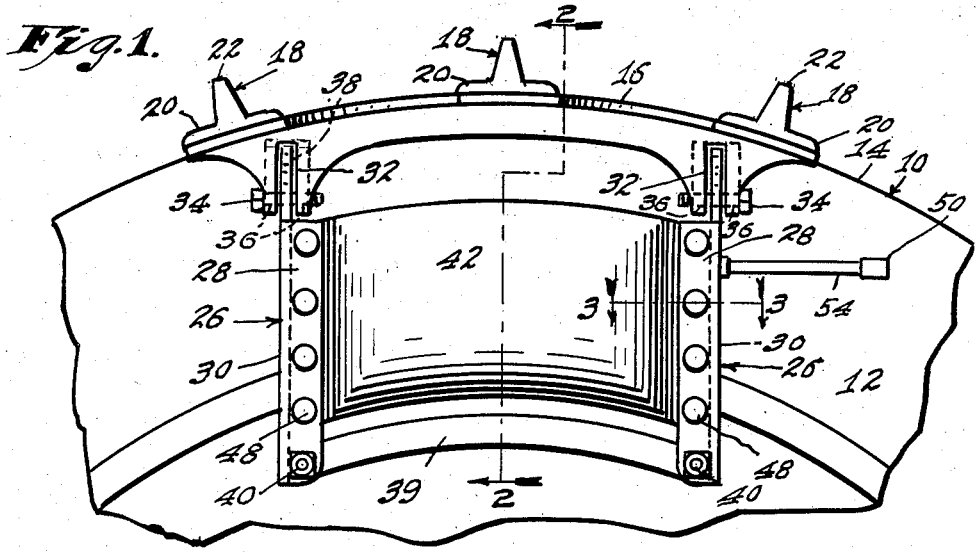
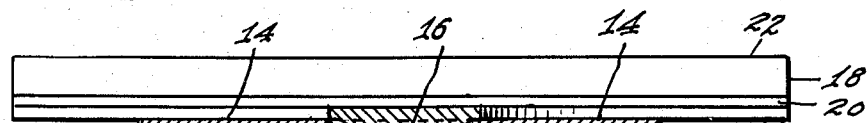
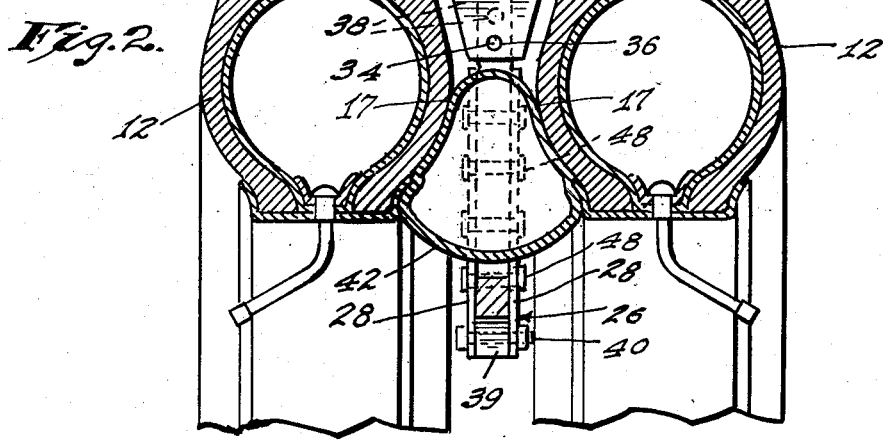
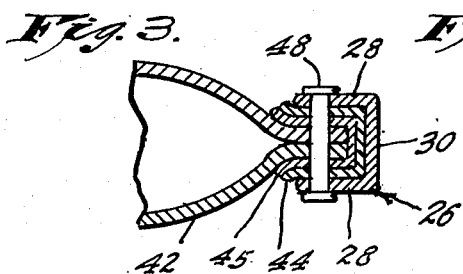
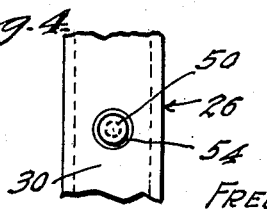
INVENTORS
FRED L. PALMER &
BY RICHARD L. PALMER,
Schiley, Zoske & Jenkins
ATTORNEYS.

Sept. 8, 1959     F. L. PALMER ET AL     2,903,037
TRACTION ATTACHMENT FOR WHEELS
Filed March 17, 1958     3 Sheets-Sheet 2

INVENTORS
FRED L. PALMER &
BY RICHARD L. PALMER,
Schley, Trask & Jenkins
ATTORNEYS

INVENTORS
FRED L. PALMER &
BY RICHARD L. PALMER,

Schley, Zask & Jenkins
ATTORNEYS

United States Patent Office 2,903,037
Patented Sept. 8, 1959

2,903,037
TRACTION ATTACHMENT FOR WHEELS
Fred L. Palmer and Richard L. Palmer, Indianapolis, Ind.
Application March 17, 1958, Serial No. 722,011
17 Claims. (Cl. 152—218)

This invention relates to a traction attachment, and more particularly to a traction attachment for dual wheeled vehicles.

It is an object of our invention to provide an inexpensive traction attachment for dual wheeled vehicles that can be quickly and easily applied to a set of dual wheels, and which can be quickly and easily removed therefrom. It is a further object of our invention to provide a traction attachment for wheeled vehicles which will substantially increase the traction of the tires on the wheels of said vehicles without injury to said tires, which is adjustable for use with a plurality of tire sizes, and which desirably is collapsible for compact storage when not in use.

In carrying out our invention in the preferred form, there is provided a plurality of cleats mounted on an arcuate frame adapted to be inserted between a pair of tires, as on a set of dual wheels, for disposing said cleats in a ground-engageable position on said tires. The frame is desirably pivotally connected adjacent each of its ends to a pair of arms interconnected and braced at their opposite ends by a strut. An inflatable bag is disposed between said pair of arms and rigidly connected thereto adjacent each of its ends. Desirably, said bag is of a size and shape such that when it is inflated it will expand laterally outwardly throughout its length to engage the tires and the wheels for holding the cleats in a fixed operative position at the circumference of the tires. Conveniently, the bag may be inflated by the excess air in one or both of the tires to which the device is attached by means of a hose having a valve at one of its ends receivable on the valve of the tire and a second valve at its opposite end receivable on a valve on the bag. And said bag may be deflated by means of its valve for removing the device from its operative position on the wheels.

The accompanying drawings illustrate our invention. In such drawings:

Fig. 1 is a side elevation of a set of dual wheels with portions broken away to show our device mounted thereon;

Fig. 2 is a cross-section taken on the line 2—2 of Fig. 1;

Fig. 3 is a horizontal section taken on the line 3—3 of Fig. 1;

Fig. 4 is a fragmental end elevation of one of the bag supporting arms and showing the valve connection for the bag;

Figure 5:
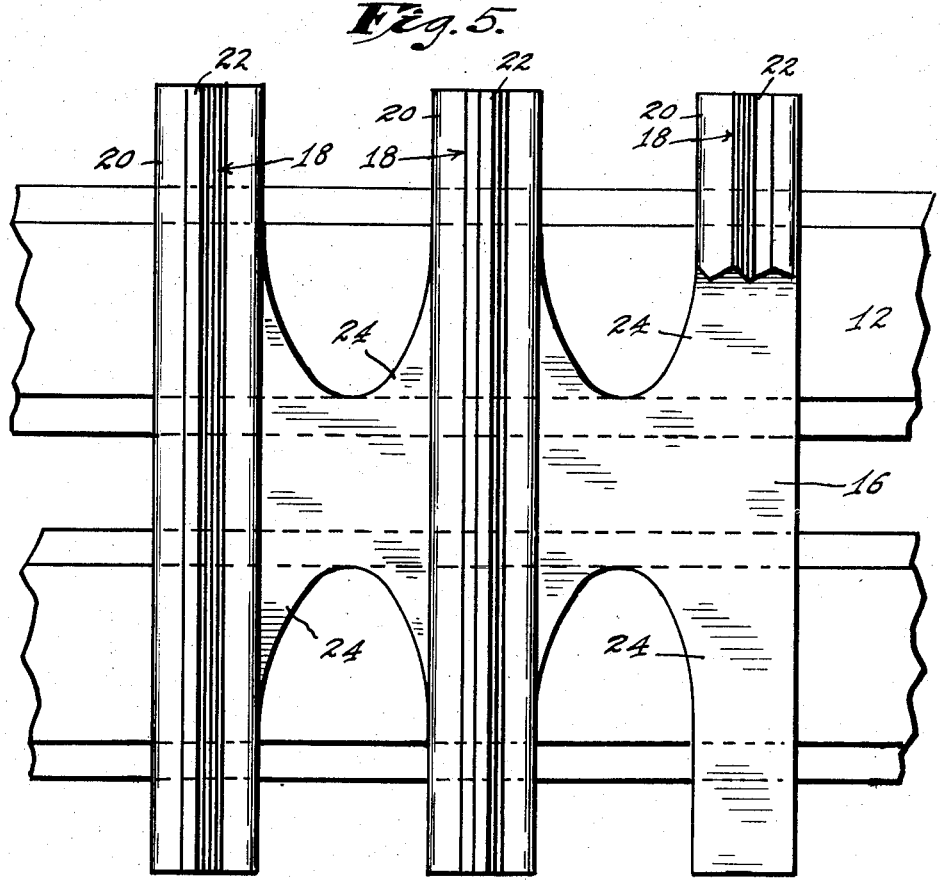
Fig. 5 is a plan view of the attachment shown in Fig. 1.

As illustrated in the drawings, our device is adapted to be used on a vehicle employing sets of dual wheels 10 (only one set being shown) upon which pairs of tires 12 are mounted, to increase the traction of the treads 14 on said tires when they lose their traction as in snow, mud, etc. Our traction attachment comprises an arcuate frame 16 adapted to be inserted between the two tires 12 of a set of dual wheels adjacent the outer circumference of said two tires. Desirably, the frame 16 has a generally wedge-shaped cross-section so that upon insertion between the tires 12 it substantially fills the space between the opposed faces of the tires between the bellies 17 and the treads 14. One or more cleats 18 are mounted on the outer face of the frame 16 in any convenient manner, such as by welding, brazing, or the like. A desired type of cleat includes an elongated base section 20 which extends across and bears on the treads 14 of a pair of the tires 12 when the attachment is in an operative position on said tires. Projecting outwardly from the outer face of each of the base sections 20 is a rib 22 which bites into the surface of the ground to provide added traction for the tires 12. We also contemplate the use of a frame and cleat arrangement in which the frame and cleats are formed in a unitary casting of rubber, or metal, or a combination thereof in which case the cleats and frame are integrally joined together. Desirably, in order to increase the ground-engageable surface of the cleats and frame and to give added strength to the frame-cleat connections, a plurality of fillets 24 are provided at the outer face of the frame 16 and interconnect said frame to the front and rear edges of the cleats 18 laterally outwardly from the edges of the frame 16. The cleats 18 may be mounted on the frame 16 at any desired angle, however, as shown in Fig. 1, we prefer to dispose the cleats at an angle normal to the frame 16 so that said cleats will extend transversely across the path of rotation of the tires 12.

Figure 6:
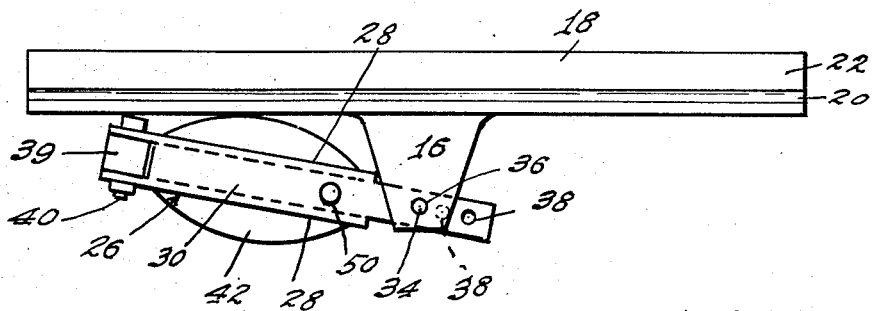
Fig. 6 is an end elevation of the attachment shown in Fig. 1 but showing said attachment in collapsed storage position.
Figure 7:
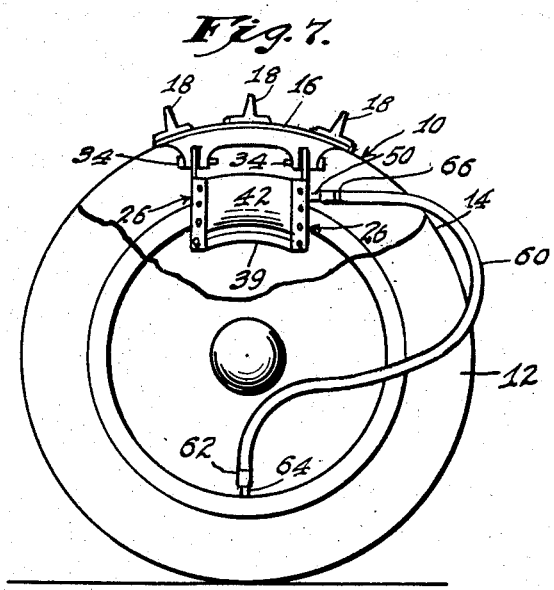
Fig. 7 is a side elevation of a set of dual wheels with portions thereof removed to show one method of inflating the bag.

An arm 26 is desirably pivotally secured to the lower face of the frame 16 adjacent each of its ends and extends downwardly from said frame between the tires 12 and wheels 10 when the attachment is in an operative position. The arms 26 are conveniently formed from a channel construction constituting a pair of parallel legs 28 interconnected by a web 30. Pivotal connection between the arms 26 and the frame 16 is provided by removing the legs 28 from the upper ends of the arms 26 so that the webs 30 on said arms may be received in transversely extending slots 32 formed in the lower face of the frame 16 adjacent each of its ends. The arms 26 are pivotally retained in the slots 32 by bolts 34 extending through openings 36 and 38 in the frame 16 and arms 26 respectively. Such a pivotal construction permits the arms 26 and the components carried thereby to be swingable about the axes of the bolts 34 from an extended operative position in which they are disposed in a plane normal to the cleats 18 to a collapsed position in which they lie in a plane substantially parallel to the plane of the cleats 18, as shown in Fig. 6. Desirably, a plurality of the openings 38 are spaced along the upper ends of the arm webs 30 to permit said arms to be adjustable with respect to the frame 16 in order that the attachment may be used on a plurality of different tire sizes.

The lower ends of the arms 26 are interconnected and braced by a strut 39 secured thereto as by bolts 40. By employing the method of interconnection between the arms 26 and the frame 16 and strut 39 shown in Fig. 1, the arms and strut may flex or move slightly with respect to frame 16 to absorb and cushion any shocks or stresses that may be imparted to the device during operation. Conveniently, in order to dispose the arms 26 and the strut 39 at a relatively large distance from the centers of the wheels 10 so that the lower ends of the arms 26 and the strut 39 will clear all of the components of the wheels 10 and thereby permit said arms to be fully inserted into operative position between the tires and wheels, the arms 26 extend inwardly of wheels from their connection to the frame 16 on chords of the wheels' circle rather than on radii of the wheels' circle; and the strut 39 has an arcuate shape to dispose its mid-section radially outwardly from the centers of the wheels 10.

An arcuate inflatable bag 42 made of any desired material, such as reinforced rubber, or the like, is disposed between the arms 26 between their points of connection to the frame 16 and the strut 39. As shown in Fig. 3, the ends of the bag 42 are closed by clips 44 press fit over the ends of the bag. Desirably, in order to prevent the sharp edges of the clips from cutting into the bag 42 gaskets 45 are interposed between the outer faces of the bag side walls and the clips 44. The ends of bag 42 are held between the legs 28 of the arms 26 as by a plurality of bolts or headed pins 48 passing through suitable aligned openings formed in the bag 42, legs 28 and clips 44. The bag is inflated and deflated through a conventional pneumatic valve 50 mounted on a valve stem 54 extending outwardly from the bag 42 through openings in one of the clips 44 and the web 30 of one of the arms 26.

One of the principal advantages of our device resides in the fact that the bag 42 may be sufficiently inflated to hold the attachment in operative position by using a small portion of the compressed air in the tires to which the device may be attached. To this end, a hose 60 is provided having a pneumatic valve 62 at one of its ends adapted to be received on the valve 64 of one of the tires 12 to open said valve for transferring air from the tire through the hose to a second valve 66 at the opposite end of the hose which is adapted to be connected to the bag valve 50 for inflating the bag 42. The bag 42 is inflated sufficiently at a pressure of 50 p.s.i. to 60 p.s.i. that it will extend laterally outwardly throughout its length to engage the opposed faces of the tires 12 and wheels 10 to bindingly retain the device in an operative position on said wheels and tires. To produce such a pressure in the bag 42, it is necessary to remove only a small portion of the compressed air normally present in one of the tires 12. For example, a standard 825 x 20 tire which is inflated to a pressure of about 65 p.s.i. will still have a pressure of about 62 p.s.i. after taking sufficient air from that tire to inflate the bag to a pressure of about 61 p.s.i. which is sufficient to cause said bag to bindingly grip the opposed faces of the tires and wheels to hold the entire device in operative position.

Figure 8:
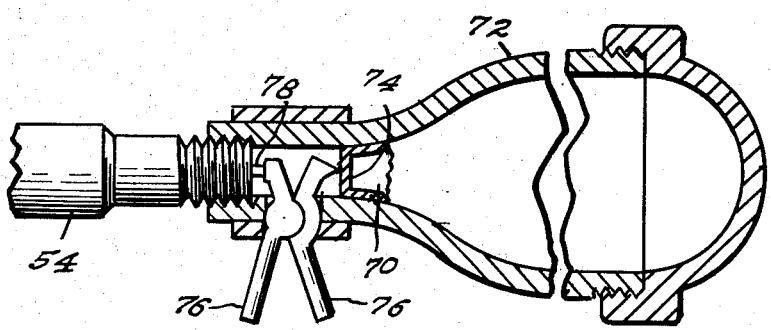
Fig. 8 is a fragmental longitudinal section showing another means of inflating the bag.

Alternatively, the bag 42 may be inflated by the gas from a small disposable compressed gas cartridge 70 carried in an adapter 72 mountable on the valve stem 54 of the bag 42. One method of inflating the bag 42 by such a cartridge is shown in Fig. 8 where the seal 74 on the cartridge 70 and the bag valve 50 are opened simultaneously by a pair of arms 76 pivotally mounted in the adapter with the inner ends of said arms positioned between the valve pin 78 and the cartridge seal 74. Thus, by forcing together the ends of the arms 76 projecting outwardly of the adapter their inner ends depress the valve pin 78 and break the seal 74 so that the gas in the cartridge 70 inflates the bag 42.

Operation of our traction attachment may be described as follows: The traction attachment is placed on a set of the dual driving wheels of a vehicle as soon as the wheels on said vehicle lose their traction in snow, mud, or the like. Under most conditions of use only one set of the dual wheels need be equipped with one of our devices. The device is attached by extending it into an operative position in which the arms 26 are disposed in a plane normal to the cleats 18 and then inserting it between the tires 12 until the base sections 20 of the cleats 18 abut the tire treads 14. In this position the frame 16 will lie between the tires 12 radially outwardly from the tire bellies 17, and the bag 42 will be between the opposed faces of the tires 10 and the wheels 12 radially inwardly of the tire bellies 17, as shown in Fig. 1. With the device thus positioned on the wheels, the valve 66 on the hose 60 is placed on the valve 50 of the bag 42, and the valve 62 is placed on the valve 64 of one of the tires 12 to transfer the air from said tire to the bag 42. This inflates the bag 42 and causes it to expand outwardly to bind against the opposed faces of the tire 12 and the wheels 10 for retaining the device on said wheels and tires. With the bag 42 located inwardly of the tire bellies 17, its inflation causes the entire attachment to be pulled inwardly toward the axis of the wheels to rigidly secure it in operative position thereon and prevent its displacement by the forces encountered in operation. After the bag 42 has been inflated, the hose 60 is desirably disconnected from the tire 12 and the bag, and the vehicle may then be driven out of its mired position with the cleats 18 providing the added necessary traction for the tires 12. Once the vehicle is on solid ground the bag 42 may be deflated and the device removed from the wheels by simply pulling it radially outwardly from its operative position between the tires 12.

While we have described the bag 42 as being inflated by the gases from the tires 12 or the cartridge 70, it is to be understood, of course, that the bag 42 may be inflated by a conventional tire pump.

We claim as our invention:
1. A traction attachment for dual wheeled vehicles, comprising a frame adapted to be inserted between the pair of tires on a set of dual wheels adjacent the circumference of said tires, a pair of arms connected to said frame adjacent one of their ends and adapted to extend inwardly between said tires and wheels, means mounted on said arms adapted to releasably grip the opposed faces of said tires and wheels for holding the attachment thereon, and one or more ground-engageable cleats carried on said frame at the circumference of the tires to provide traction therefor.

2. A traction attachment as set forth in claim 1 in which said arms are pivotally connecting to said frame for collapsing said attachment for storage.

3. A traction attachment for dual wheeled vehicles, comprising a frame adapted to be inserted between the pair of tires on a set of dual wheels adjacent the circumference of said tires, a pair of arms connected to said frame adjacent one of their ends and braced at their opposite ends by an interconnecting strut, means interposed between said arms between their connections to the frame and said strut adapted to releasably grip the opposed faces of said tires and wheels for holding the attachment thereon, and one or more ground-engageable cleats carried on said frame at the circumference of the tires to provide traction therefor.

4. A traction device as set forth in claim 3 in which the connections between said arms and the frame and interconnecting strut are sufficiently flexible to permit said arms to move in a plane normal to the cleats for absorbing the shocks imparted to the attachment.

5. A traction attachment for dual wheeled vehicles, comprising a frame adapted to be inserted between a pair of tires on a set of dual wheels adjacent the circumference of said tires, a pair of arms connected to said frame at one of their ends and interconnected at their opposite ends by an arcuate strut, said arms extending inwardly from said frame at an angle to the radii of said tires, means interposed between said arms between their connections to the frame and said strut, said means being adapted to releasably grip the opposed faces of said tires and wheels for holding the attachment thereon, and one or more ground-engageable cleats carried on said frame at the circumference of the tires to provide traction therefor.

6. A traction attachment for dual wheeled vehicles, comprising an elongated frame adapted to be inserted between the pair of tires on a set of dual wheels adjacent the circumference of said tires, said frame having a generally wedge-shaped cross-section and substantially filling the space between said tires outwardly from the tire bellies along its length, a pair of arms connected to said frame adjacent one of their ends, means mounted on said arms adapted to releasably grip the opposed faces of said tires and wheels for holding the attachment thereon, and one or more ground-engageable cleats carried on said frame at the circumference of the tires to provided traction therefor.

7. A traction attachment for dual wheeled vehicles, comprising an arcuate frame adapted to be inserted between the pair of tires on a set of dual wheels adjacent the circumference of said tires, a pair of arms secured to said frame adjacent one of their ends, an elongated bag secured to said arms and adapted to be inflated for bindingly retaining the attachment on said pair of wheels and tires, and one or more ground-engageable cleats carried on said frame at the circumference of the tires to provide traction therefor.

8. A traction attachment for dual wheeled vehicles comprising an arcuate frame adapted to be inserted between the pair of tires on a set of dual wheels adjacent the circumference of said tires, a pair of arms secured to said frame adjacent one of their ends, an elongated bag secured to said arms and adapted to be inflated for bindingly retaining the attachment on said pair of wheels and tires, said bag being arcuate shaped for engagement with the opposed faces of both the tires and wheels along its length, and one or more ground-engageable cleats carried on said frame at the circumference of the tires to provide traction therefor.

9. A traction attachment as set forth in claim 8 in which said bag is engageable with the opposed faces of the tires inwardly of their bellies for pulling said cleats into engagement with the tire treads.

10. A traction attachment as set forth in claim 8 with the addition that said bag is inflatable by the compressed gas in a cartridge carried in an adapter mountable on the valve stem of the bag.

11. A traction attachment for dual wheeled vehicles comprising an arcuate frame adapted to be inserted between the pair of tires on a set of dual wheels adjacent the circumference of said tires, a pair of arms secured to said frame adjacent one of their ends, an elongated bag secured to said arms and adapted to be inflated for bindingly retaining the attachment on said pair of wheels and tires, said bag being arcuate shaped for engagement with the opposed faces of both the tires and wheels along its length, and a plurality of ground-engageable cleats carried on said frame at the circumference of the tires to provide traction therefor, said pair of arms being adjustably mounted on said frame for disposing said bag at a plurality of distances from the frame and cleats to permit the attachment to be used on a plurality of sizes of tires.

12. A traction attachment for dual wheeled vehicles comprising an arcuate frame adapted to be inserted between the pair of tires on a set of dual wheels outwardly of the bellies of said tires, one or more ground-engageable cleats mounted on said frame and extending across the treads of said tires to provide traction therefor, and means interconnected to said frame adapted to releasably grip the opposed faces of said tires and wheels and pull said frame and cleats radially inwardly with respect to said tires for releasably retaining said frame and cleats in said radially inwardly disposed position.

13. A traction attachment as set forth in claim 12 in which the major axis of said cleats is normal to the path of rotation of the tires.

14. A traction attachment for dual wheeled vehicles comprising an arcuate frame adapted to be inserted between the pair of tires on a set of dual wheels adjacent the circumference of said tires, a plurality of cleats mounted on said frame and extending across the treads of said tires to provide traction therefor, a plurality of fillets on each side of said frame and secured to the fore and aft edges of said cleats laterally outwardly of said frame, and means interconnected to said frame adapted to releasably pull said frame and cleats radially inwardly with respect to said tires and to releasably retain said frame and cleats in said radially inwardly disposed position.

15. In combination, a traction attachment for dual wheeled vehicles, comprising an arcuate frame adapted to be disposed between the pair of tires on a set of said dual wheels adjacent their circumference, a pair of arms connected to said frame at one of their ends, an inflatable bag mounted on said arms and having a valve through which said bag may be inflated for bindingly engaging said tires and wheels to hold the attachment thereon, a plurality of ground-engageable cleats carried on said frame at the circumference of the tires to provide traction therefor, and a hose having valve means adapted to fit over the valves on said bag and one of the tires for inflating the bag with air from said tire.

16. A traction attachment for dual wheeled vehicles, comprising an arcuate frame insertable between the pair of tires on a set of dual wheels outwardly of the bellies of said tires, one or more ground-engageable cleats mounted on said frame and extending across the treads of said tires to provide traction therefor, and means interconnected to said frame adapted to releasably grip the opposed faces of said tires radially inwardly of the bellies thereof to releasably retain said cleats in a fixed circumferential position upon said tires.

17. A traction attachment for dual wheeled vehicles as set forth in claim 16 in which said means is adjustably interconnected to said frame for disposing the same at a plurality of distances from said frame for gripping the opposed faces of a plurality of different sized tires radially inwardly of the bellies of said tires.

References Cited in the file of this patent

UNITED STATES PATENTS

| 1,600,588 | Hipkins | Sept. 21, 1926 |
|---|---|---|
| 2,312,486 | Riesen | Mar. 2, 1943 |
| 2,365,279 | Kraft | Dec. 19, 1944 |
| 2,706,510 | Irvin | Apr. 19, 1955 |